Figure 1:
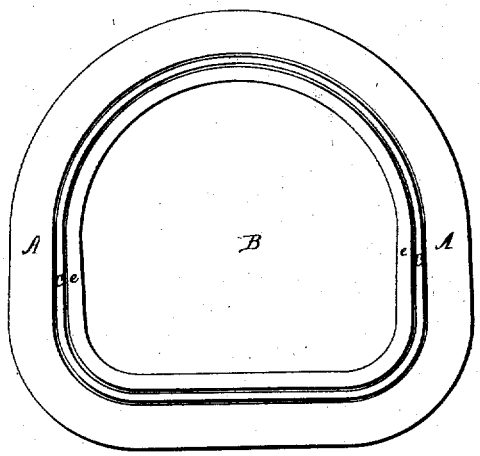

O. A. Bingham,

Chair Seat.

No. 4,164. Reissued Oct. 25. 1870.

O. A. Bingham
by his Attys
Crosby, Halsted & Gould

Witnesses
J. B. Kidder
M. W. Frothingham

N. PETERS, PHOTO-LITHOGRAPHER, WASHINGTON, D. C.

United States Patent Office.

OSMORE A. BINGHAM, OF ASHBURNHAM, MASSACHUSETTS, ASSIGNOR TO GEORGE C. WINCHESTER.

Letters Patent No. 94,553, dated September 7, 1869; reissue No. 3,890, dated March 22, 1870; reissue No. 4,164, dated October 25, 1870.

IMPROVEMENT IN CHAIR-SEATS.

The Schedule referred to in these Letters Patent and making part of the same.

*To all whom it may concern:*

Be it known that I, OSMORE A. BINGHAM, formerly of Gardner, but now of Ashburnham, in the county of Worcester and State of Massachusetts, have invented a new and useful Improvement in the Application of a Seat or Cushion to the Back or Seat-Frame of a Chair; and I do hereby declare that the following, taken in connection with the drawing which accompanies and forms part of this specification, is a description of my invention sufficient to enable those skilled in the art to practice it.

In my invention I employ a web or seating stretched across the frame, and held in place by a continuous bent strip, preferably of wood, extending entirely around the opening of the frame, and fastened to the frame in such manner as to firmly hold the edges of the web or seating in place, the security of the web being dependent upon the hold of this continuous bent strip upon such edges.

It is in a seat having a web or seating confined in place by a continuous bent strip, that my invention primarily consists.

The invention also consists in a peculiar method of applying this strip and the web, in such manner that the web shall cover and conceal the strip.

Figure 1 denotes a top view of the seat-frame and the web-retaining strip.

Figure 2:
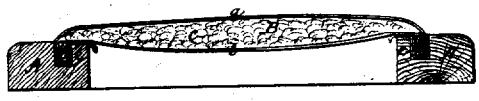

Figure 2 is a transverse section of a chair-seat embodying the improvement.

A denotes the seat-frame, and

B, the web applied thereto.

The said seat-frame is shown as formed with a groove, *e*, extending around it and arranged in it, near its inner edge, such groove being either square or rectangular in transverse section.

The web (which may be formed of two cloths, *a b*, composing the case of a cushion, and containing between them the stuffing *c*, of hair or other proper material,) is shown as lapped at its edge around a continuous bent strip, C, of wood or other suitable material, having a section to correspond in form with that of the groove.

Figure 3:
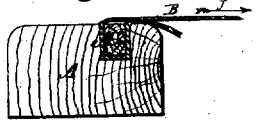

This strip, with the edges of the web around it, is shown as inserted and forced into the groove, the whole being so that, when the strip is in the groove, such strip shall be covered on all four sides by the web, the latter being preferably made to project from the strip in manner as shown in Figure 3, which exhibits, on an enlarged scale, the groove, the strip, and a piece of the webbing, and shows the method in which the latter is arranged with and around the strip so as to cover it on its top surface.

In such fig. 3—

A denotes the frame-bar;

*e*, the groove;

B, the web, and

C, the strip.

Figure 4:
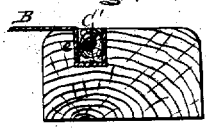

Figure 4 exhibits the ordinary method of fixing a chair-seat or back to its frame by means of a straight groove and straight strip.

In this latter figure it will be seen that the web or seat B is not arranged so as to cover the top surface of the strip C, such strip being usually held in place by nails, screws, or cement, for, unless so fastened, a slight pull, exerted horizontally on the web, will often serve to draw the strip and web out of the groove.

With the specific arrangement of the seating, shown in figs. 2 and 3, so as to cover the strip, not only will it be impossible to detach the strip from the groove by a horizontal strain on the webbing, exerted in the direction of the arrow *f*, but the strip will be covered, so as to be out of sight, by the webbing, and thus a better finish of the chair-seat will be made. Furthermore, no nails or screws will be absolutely required to keep the strip in place in the groove.

When the web is strained horizontally, while held by the strip in manner as shown in fig. 4, the tendency is to raise the strip out of the groove; but under the arrangement of the web and the strip in manner as shown in fig. 3, any tendency of a horizontal draft on the web to pull the strip out of the groove, will be counteracted or overcome by the web which laps over the strip, as such will prevent the strip from being drawn out of the groove.

By the employment of the continuous bent strip as described, namely, so that it shall be in contact with and retain the entire edge of the web, the web can be readily applied to chair-frames made more or less curvilinear in shape, and the strip will not only secure the whole edge properly in position, but will tend to reinforce or strengthen the frame.

I claim—

1. A chair-seat, having its web or seating secured to the frame by a continuous bent web-retaining strip or splint.

2. The strip C and web B, so arranged and applied to the groove *e* that the web covers and conceals the strip, substantially as shown and described.

OSMORE A. BINGHAM.

Witnesses:

J. B. CROSBY,

FRANCIS GOULD.